United States Patent
Jebens

Patent Number: 5,949,567
Date of Patent: Sep. 7, 1999

[54] SELF ADJUSTING TUNED RESONANT PHOTODIODE INPUT CIRCUIT

[75] Inventor: Robert W. Jebens, Skillman, N.J.

[73] Assignee: Lucent Technologies Inc., Murray Hill, N.J.

[21] Appl. No.: 08/762,553

[22] Filed: Dec. 9, 1996

[51] Int. Cl.$^6$ .................................................. H04B 10/06
[52] U.S. Cl. ................ 359/189; 250/214 A; 250/214 R; 327/291; 359/191; 359/194
[58] Field of Search ..................................... 359/189, 191, 359/194; 250/214 A, 214 AG, 214 AL, 214 B, 214 C, 214 R; 327/291

[56] References Cited

U.S. PATENT DOCUMENTS

| | | | |
|---|---|---|---|
| 3,979,686 | 9/1976 | Abrams et al. ........................ | 359/191 |
| 4,841,519 | 6/1989 | Nishio ..................................... | 359/194 |
| 5,008,526 | 4/1991 | Green .................................. | 250/214 R |
| 5,459,599 | 10/1995 | Van Deventer ......................... | 359/189 |
| 5,519,389 | 5/1996 | DeGunther et al. ................ | 250/214 R |
| 5,565,672 | 10/1996 | Siegel et al. ........................ | 250/214 A |
| 5,801,867 | 9/1998 | Geller et al. ............................ | 359/189 |
| 5,812,012 | 9/1998 | Jebens ..................................... | 327/291 |

*Primary Examiner*—Thomas Mullen
*Assistant Examiner*—John Tweel, Jr.

[57] ABSTRACT

A self adjusting tuned resonant photodiode input circuit wherein an active feedback signal adjusts a reverse bias voltage across a photodiode to tune a resonant frequency to a center frequency. This results in a stable improved passband of the receiver front end.

24 Claims, 1 Drawing Sheet

SELF ADJUSTING TUNED RESONANT PHOTODIODE INPUT CIRCUIT

CROSS REFERENCES TO RELATED APPLICATIONS

This application is related to U.S. patent applications Ser. No. 08/762,552, now U.S. Pat. No. 5,812,012 entitled "High Efficiency Resonant Network Drive For An Infrared LED" filed on Dec. 9, 1996, Ser. No. 08/723,732, now abandoned entitled "Optical Arrangement For Full Duplex Free Space Infrared Transmission" filed on Sep. 30, 1996, and Ser. No. 08/736,700, now U.S. Pat. No. 5,828,055 entitled "Wide-Band Tuned Input Circuit For Infrared receivers" filed on Oct. 28, 1996, having a common assignee and a common inventor.

FIELD OF THE INVENTION

This invention relates generally to infrared communications, and more particularly to infrared FM receivers.

BACKGROUND OF THE INVENTION

When using photodiodes in a receiver system using a carrier such as FM it is often desirable to tune the photodiode capacitance at the frequency of interest with an inductor in parallel. With such an arrangement Q's of 30 to 50 are easily realizable. A Q of 30 would correspond to a 3 bD bandwidth of 3.3 percent of the operating frequency and a gain in signal voltage of 30 dB over an untuned photodiode. In portable equipment using such high Q's, the resonant frequency of the input circuit will vary more than generally be tolerated due to changes in battery voltage and temperature affecting the capacitance of the photodiode. In addition, it would be desirable at the same time to improve the bandwidth and response of the receiver over that of a high Q single tuned circuit.

Therefore, there is a need to tune the resonant frequency of the input circuit wherein the effect of temperature and supply voltage are minimized while improving on the passband response of a single high Q tuned circuit.

SUMMARY OF THE INVENTION

In accordance with the present invention, there is provided a self adjusting tuned resonant photodiode input circuit. An active feedback signal adjusts a reverse bias voltage across the photodiode to tune a resonant frequency to a center frequency. This results in a stable improved passband of the receiver front end.

BRIEF DESCRIPTION OF THE DRAWINGS

A more complete understanding of the present invention may be obtained from consideration of the following description in conjunction with the drawing in which.

DETAILED DESCRIPTION OF VARIOUS ILLUSTRATIVE EMBODIMENTS

Figure 1:
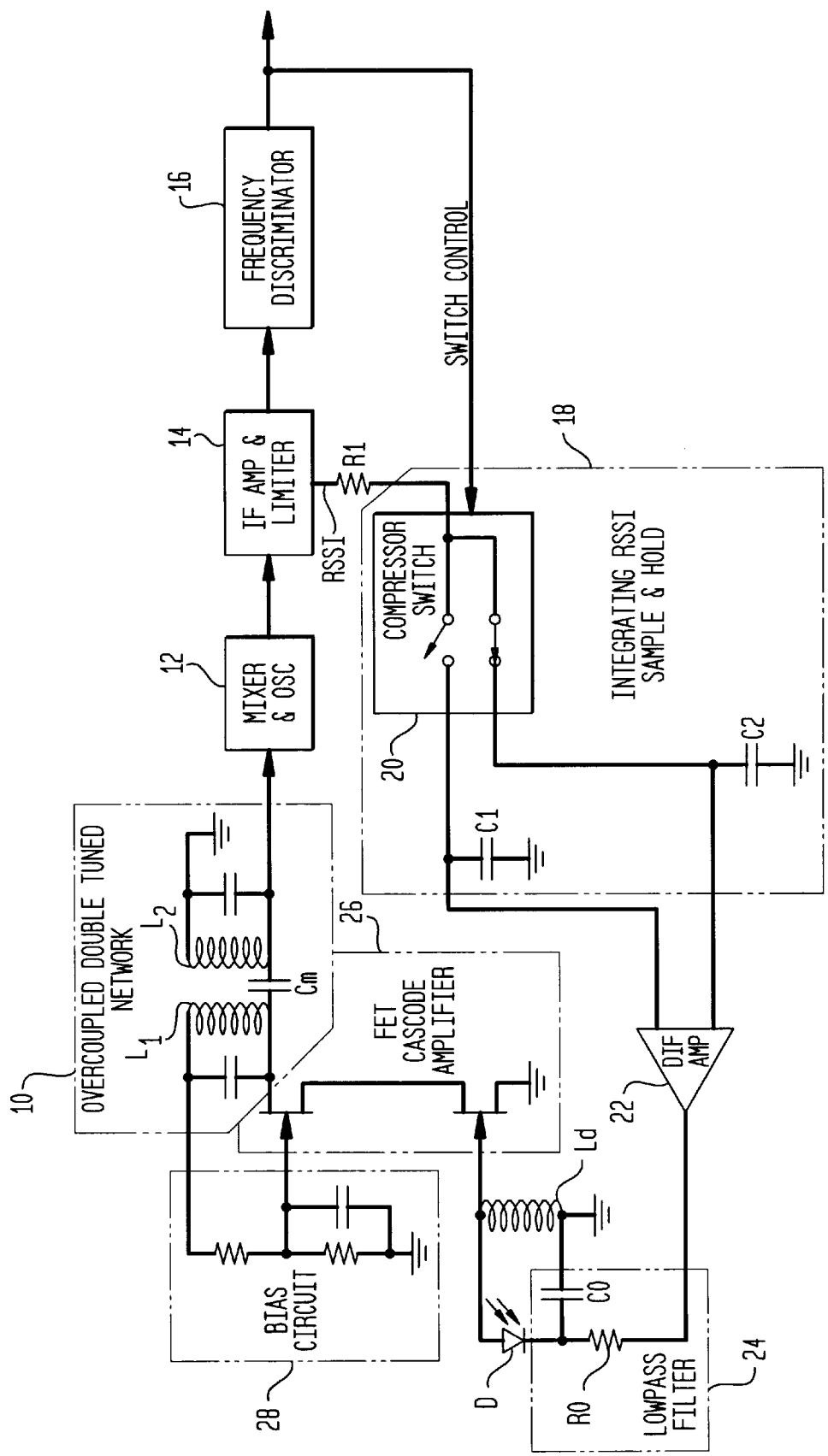
FIG. 1 is a schematic diagram of the present invention a self adjusting tuned resonant photodiode input circuit.

Although the present invention is particularly well suited for use with infrared LEDs and photodiodes, and shall be described with respect to this application, the methods and apparatus disclosed here can be applied to other light transmitting and receiving devices equally as well.

Referring to FIG. 1 there is shown a schematic diagram of the present invention a self adjusting tuned resonant photodiode input circuit. An over coupled double tuned network with capacitive coupling (OCDT Network) 10 is comprised of a transformer having a primary coil with an inductance of $L_1$ and a secondary coil with an inductance of $L_2$ which are coupled by a capacitance $C_m$. Output from the OCDT Network 10 is coupled to a mixer and oscillator 12. Output from the mixer and oscillator 12 is coupled to an IF amplifier and limiter 14. The IF amplifier and limiter 14 provides a Received Signal Strength Indicator (RSSI) signal and an output. The output of the IF amplifier and limiter 14 is coupled to a frequency discriminator 16. Output of the frequency discriminator 16 provides a switch control signal. An integrated RSSI Sample and Hold circuit 18 is comprised of a CMOS SPDT switch 20 which is coupled to the RSSI signal through a resistor $R_1$ and is controlled by the Switch Control signal. A first output of the CMOS SPDT switch 20 is coupled to ground through a "hold" capacitor $C_1$. A second output of the CMOS SPDT switch 20 is coupled to ground through a "hold" capacitor $C_2$. Inputs of a differential amplifier 22 are coupled to the first output and the second output of the CMOS SPDT switch 20. Output of the differential amplifier 22 is coupled to a low pass filter 24. An FET cascode amplifier 26 is coupled to drive the OCDT network 10 in response to a signal from a photodiode D. Bias circuit 28 provides a suitable bias for the operation of the FET cascode amplifier 26.

Q's of 30 to 50 are realizable with actual devices and within operating voltages when an inductor, $L_d$, is used to resonate a capacitance, $C_d$, of the photodiode D. A Q of 30 corresponds to a 3 dB bandwidth of 3.3 percent of the operating frequency and a gain in signal voltage of 30 dB over an untuned photodiode. In portable communication equipment using such high Q's, the resonant frequency of the input circuit will vary more than is acceptable as the battery voltage changes.

In the representative embodiment, shown in FIG. 1, an active feedback signal adjusts the reverse bias voltage across the photodiode D, and thus its capacitance, to tune the resonant frequency precisely to the center frequency of the over coupled double tuned circuit. The frequency modulation of the signal, or the diode shot noise in the absence of a signal, sweeps the instantaneous frequency across the amplitude response of the circuit. A fast Received Signal Strength Indicator (RSSI) signal from the IF Amplifier and FM limiter circuit 14 provides amplitude information while the output of the frequency discriminator 16 provides frequency information. The output of the frequency discriminator 16 acts as a switch control signal for the CMOS SPDT switch 20. The common input of the CMOS SPDT switch 20 is connected through $R_1$ to the RSSI output. The outputs of the CMOS SPDT switch 20 are connected to respective integrating capacitors $C_1$ and $C_2$ and the inputs of a high input impedance differential amplifier 22. The two voltages of the two integrating sample and hold circuits (Integrating RSSI Sample & Hold 18) represent the size of the amplitude response above and below the center frequency. If the amplitude response is not symmetrical than a differential voltage appears at the input of the differential amplifier 22 causing a bias voltage change across the photodiode D returning the input frequency response. The output of the differential amplifier 22 is biased such that it is fairly close to the positive supply voltage with equal voltages on its inputs. This ensures that the capacitance $C_d$ of the photodiode D is minimized and has maximum linearity in normal operation. The differential amplifier 22 drives the low pass filter 24 which is comprised of $R_0$ and $C_0$. This decreases noise injected by the differential amplifier 22 into the receiver input. $C_0$ must be very large compared to $C_d$. $R_0$ needs to be fairly small to support the photo current in bright ambient light with a low voltage drop, it does however, tend to keep the differential amplifier 22 stable driving the large value of $C_0$.

The OCDT network 10 with capacitive mutual coupling $C_m$, in the output of the cascode FET amplifier 26 performs three important functions. First, the capacitive mutual coupling $C_m$ provides an additional 6 dB/octave skirt selectivity at the low frequency and of the spectrum over what a double tuned circuit with inductive mutual coupling would provide. Together with the effect of inductor, $L_d$, low frequency noise from ambient light sources is greatly reduced. Second, if the Q's of the primary coil and secondary coil and the degree of mutual coupling are chosen correctly the resulting overall response of the combination of this circuit and the input circuit can be made to be flat for a wider bandwidth than the input circuit alone. This combination of a single tuned circuit combined with an over coupled double tuned circuit is described in an article entitled "On Single and Coupled Tuned Circuits Having Constant Response-Band Characteristics" by Ho-Shou Loh in Proceeding of I.R.E. Vol. 26 pp 469–474, April 1938. There are limits as to how far this approach can be used to widen the effective bandwidth of the input circuit. The signal to noise performance of the skirt of the input circuit cannot be improved by the gain compensation of the double tuned circuit so that the noise performance at the band edges will be no better than that of the input circuit. In addition as more and more compensation effects of the double tuned circuit are used, that circuit and the centering of the input circuit become more critical. For a flat response bandwidth corresponding to a 6 to 10 dB "down" bandwidth of input circuit Q, practical system bandwidths of 5 to 10 percent of the operating frequency are the useful limit of this approach. The third function of the OCDT network 10 is to provide more selectivity while improving the phase characteristic over what could be achieved in a single tuned circuit of the same bandwidth. This circuit provides very good noise performance for narrow band applications.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

What is claimed:

1. A self adjusting tuned resonant photodiode input circuit comprising:
    a photodiode;
        wherein an active feedback signal adjusts a reverse bias voltage across said photodiode to tune a resonant frequency to a center frequency.

2. The circuit as recited in claim 1 wherein a nonsymmetrical amplitude response above said center frequency and below said center frequency defines a differential voltage causing a bias voltage change across said photodiode.

3. The circuit as recited in claim 2 wherein integrating sample and hold circuit has a first sample voltage which corresponds to an amplitude response above said center frequency and a second sample voltage which corresponds to an amplitude response below said center frequency, said differential voltage being a function of a difference of said first sample voltage and said second sample voltage.

4. The circuit as recited in claim 3 wherein said differential voltage is coupled through a low pass filter before causing a bias voltage change across said photodiode.

5. The circuit as recited in claim 3 wherein said amplitude response below said center frequency corresponds to a received signal strength indicator.

6. The circuit as recited in claim 3 wherein said amplitude response above said center frequency corresponds to a received signal strength indicator.

7. A self adjusting tuned resonant photodiode input circuit comprising:
    a photodiode;
    an over coupled double tuned network responsive to said photodiode;
        wherein an active feedback signal adjusts a reverse bias voltage across said photodiode to tune a resonant frequency to a center frequency of said over coupled double tuned network.

8. The circuit as recited in claim 7 wherein said over coupled double tuned network has capacitive mutual coupling.

9. The circuit as recited in claim 7 wherein said over coupled double tuned network comprises a transformer having capacitive mutual coupling.

10. The circuit as recited in claim 7 wherein a nonsymmetrical amplitude response above said center frequency and below said center frequency defines a differential voltage causing a bias voltage change across said photodiode.

11. The circuit as recited in claim 10 wherein integrating sample and hold circuit has a first sample voltage which corresponds to an amplitude response above said center frequency and a second sample voltage which corresponds to an amplitude response below said center frequency, said differential voltage being a function of a difference of said first sample voltage and said second sample voltage.

12. The circuit as recited in claim 11 wherein said differential voltage is coupled through a low pass filter before causing a bias voltage change across said photodiode.

13. The circuit as recited in claim 11 wherein said amplitude response below said center frequency corresponds to a received signal strength indicator.

14. The circuit as recited in claim 11 wherein said amplitude response above said center frequency corresponds to a received signal strength indicator.

15. In an FM receiver a self adjusting tuned resonant photodiode input circuit comprising:
    a photodiode;
    an over coupled double tuned network responsive to said photodiode;
        wherein an active feedback signal adjusts a reverse bias voltage across said photodiode to tune a resonant frequency to a center frequency of said over coupled double tuned network.

16. The circuit as recited in claim 15 wherein said over coupled double tuned network has capacitive mutual coupling.

17. The circuit as recited in claim 15 wherein said over coupled double tuned network comprises a transformer having capacitive mutual coupling.

18. The circuit as recited in claim 15 wherein a nonsymmetrical amplitude response above said center frequency and below said center frequency defines a differential voltage causing a bias voltage change across said photodiode.

19. The circuit as recited in claim 18 wherein integrating sample and hold circuit has a first sample voltage which corresponds to an amplitude response above said center frequency and a second sample voltage which corresponds to an amplitude response below said center frequency, said differential voltage being a function of a difference of said first sample voltage and said second sample voltage.

20. The circuit as recited in claim 19 wherein said differential voltage is coupled through a low pass filter before causing a bias voltage change across said photodiode.

21. The circuit as recited in claim 19 wherein said amplitude response below said center frequency corresponds to a received signal strength indicator.

22. The circuit as recited in claim 19 wherein said amplitude response above said center frequency corresponds to a received signal strength indicator.

23. The circuit as recited in claim 15 wherein said photodiode is responsive to infrared light.

24. In an FM receiver a self adjusting tuned resonant photodiode input circuit comprising:

a photodiode;

an over coupled double tuned network responsive to said photodiode;
    said over coupled double tuned network comprises a transformer having capacitive mutual coupling;
    wherein an active feedback signal adjusts a reverse bias voltage across said photodiode to tune a resonant frequency to a center frequency of said over coupled double tuned network such that a nonsymmetrical amplitude response of received signal strength indicator above said center frequency and below said center frequency defines a differential voltage causing a bias voltage change across said photodiode.

\* \* \* \* \*